United States Patent Office 3,549,50[0]
Patented Dec. 22, 19[...]

3,549,500
NOVEL CHONDROITINASE AND METHOD
OF ITS RECOVERY
Sakaru Suzuki, Nagoya, Japan, assignor to Seikagaku Kogyo Co., Ltd., Toyko, Japan, a corporation of Japan
Filed Apr. 2, 1968, Ser. No. 718,178
Claims priority, application Japan, July 22, 1967, 42/47,123; Mar. 30, 1968, 43/20,921
Int. Cl. C07g 7/028
U.S. Cl. 195—62                                  14 Claims

ABSTRACT OF THE DISCLOSURE

A novel enzyme which has been termed chondroitinase-AC extracted from the cell of a known soil bacterium *Flavobacterium heparinum*, which can be clearly distinguished from the known chondroitinase-ABC in respect of the properties (i) it degrades chondroitin sulfate A, (iii) it degrades chondroitin sulfate C but (ii) it does not degrade chondroitin sulfate B; and a method of extracting and recovering said novel enzyme from the said cell.

---

Figure 1:
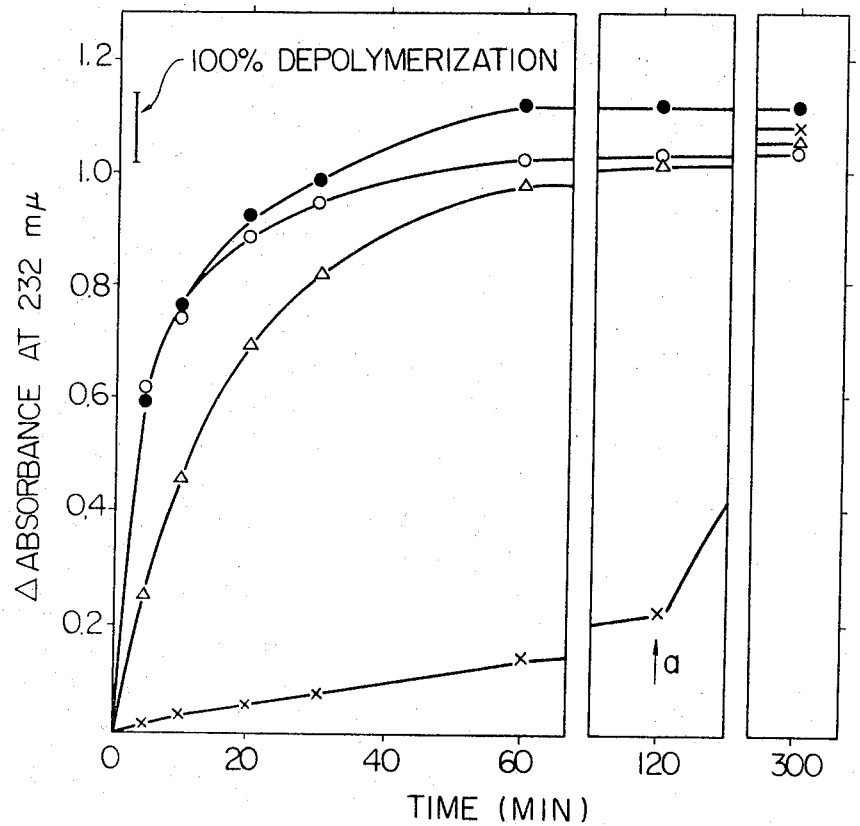

This invention relates to a novel enzyme chondroitinase extracted from a known soil bacterium, *Flavobacterium heparinum*, from the cell of which, it is known, chondroitinase can be extracted, and to a method of extracting and recovering the said novel enzyme from the said cell.

The known enzyme, chondroitinase-ABC, extracted from the cell of the said known bacterium degrades chondroitin sulfate A, chondroitin sulfate B and chondroitin sulfate C. The novel enzyme of the invention, which has been termed chondroitinase-AC, can be clearly distinguished from the known chondroitinase-ABC in respect of the following properties. Namely, the novel enzyme of the invention:

(i) degrades chondroitin sulfate A;
(ii) does not degrade chondroitin sulfate B; and
(iii) degrades chondroitin sulfate C.

It can also be clearly distinguished from the known enzyme in that (iv) chondroitin sulfate B is a competitive inhibitor against the enzyme of the invention.

It has been known that chondroitinase-ABC is extracted from the cell of *Flavorbacterium heparinum* (The Journal of Biological Chemistry, vol. 235, No. 11, November 1960, pages 3066–3069), and that chondroitinase-ABC is also extracted from the cell of *Proteus vulgaris* (The Journal of Biological Chemistry, vol. 235, No. 12, November 1960, pages 3580–3588).

It has hitherto been known that the known enzyme chondroitinase, which forms 2-acetamide-2-deoxy-3-O-($\beta$-D-gluco - 4 - enepyranosyluronic acid)-4-O-sulfo-D-galactose (may be referred to simply as $\Delta$Di4S) and/or 2-acetamide - 2 - deoxy-3-O-($\beta$-D-gluco - 4 - enepyranosyluronic acid)-6-O-sulfo-D-galactose (may be referred to simply as $\Delta$Di6S) by degrading chondroitin sulaftte in accordance with an elimination reaction, degrades chondroitin sulfate A (ChS A for short), chondroitin sulfate B (ChS for short), and chondroitin sulfate C (ChS C for short). On the other hand, Linker et al. report in the above-mentioned articles that an enzyme system which will degrade chondroitin sulfate is present in the cell of *Flavobacterium heparinum*, and this enzyme system is an enzyme (chondroitinase-ABC) which degrades any of ChS A, ChS B and ChS C.

We have made an extensive study of enzymes to be extracted from the cell of *Flavobacterium heparinum*, and as a result, succeeded in separating and recovering a novel enzyme having a high activity, i.e., chondroitinase-AC having new substrate specificities (i), (ii) and (iii), fr[om] this cell, in addition to chondroitinase-ABC which [...] grades any of ChS A, ChS B and ChS C to form $\Delta$Di and/or $\Delta$Di6S. The obtained novel enzyme chondroitina[se] AC has utility as mentioned below.

As is well known, ChS A, ChS B and ChS C are i[so]mers resembling closely with each other in chemical str[uc]ture and physico-chemical behaviour, and it has been i[m]possible to determine a tiny amount of each of them. T[he] novel enzyme chondroitinase-AC extracted from *Fla[vo]bacterium heparinum*, however, in combination with [the] known enzyme chondroitinase-ABC and chondo-sulf[at]ases, makes it possible to determine a tiny amount of e[ach] of the three isomers. ChS A, ChS B and ChS C. This c[on]stitutes effective means of research in such fields as b[io]chemistry, pathology and physiology. It provides new [ef]fective means for the investigation of the distributi[on] metabolism or biosynthesis of mucopolysaccharides p[res]ent in living organisms, or for the study of diseased tiss[ue] relating to the mucopolysaccharides.

Accordingly, an object of the invention is to provid[e a] novel and useful enzyme chondroitinase AC extrac[ted] from *Flavobacterium heparinum*.

Another object of the invention is to provide a met[hod] of extracting and recovering the said novel enzyme ch[on]droitinase AC.

Many other objects and advantages of this invent[ion] will become clearer from the description which follo[ws].

The basic properties of the novel enzyme chondroi[tin]ase-AC extracted from the cell of *F. heparinum*, wh[ich] distinguish the enzyme of the invention from the kno[wn] chondroitinase, and other properties are listed below.

Basic properties (i) It degrades ChS A.
(ii) It does not degrade ChS B.
(iii) It degrades ChS C.

Figures 1, 2:
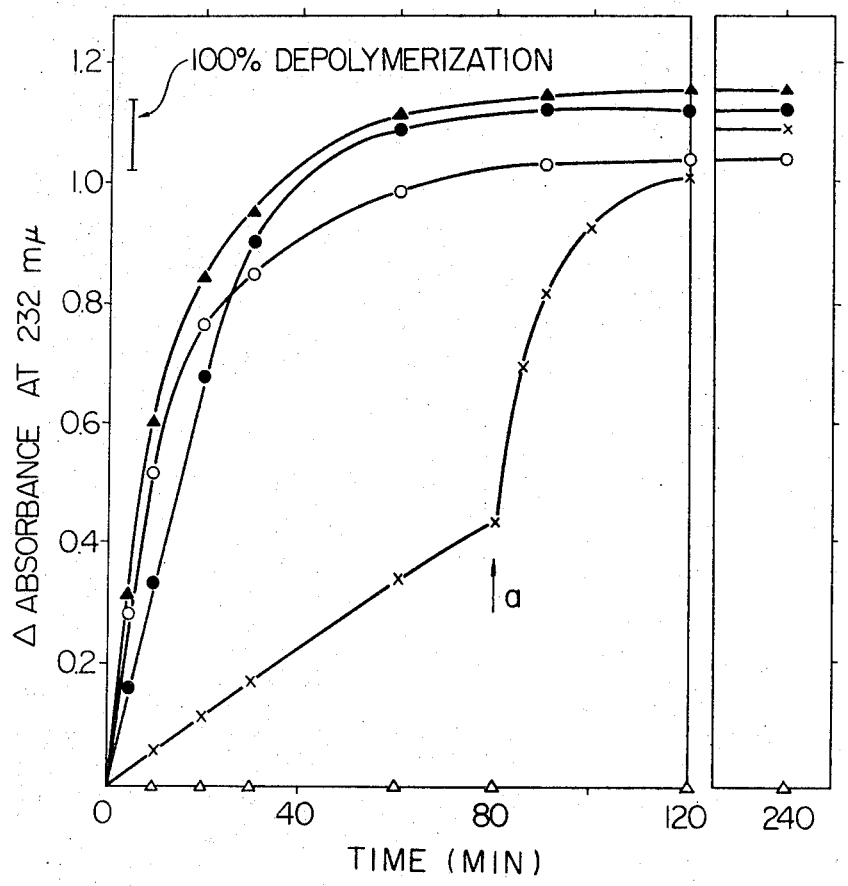
Figure 2:
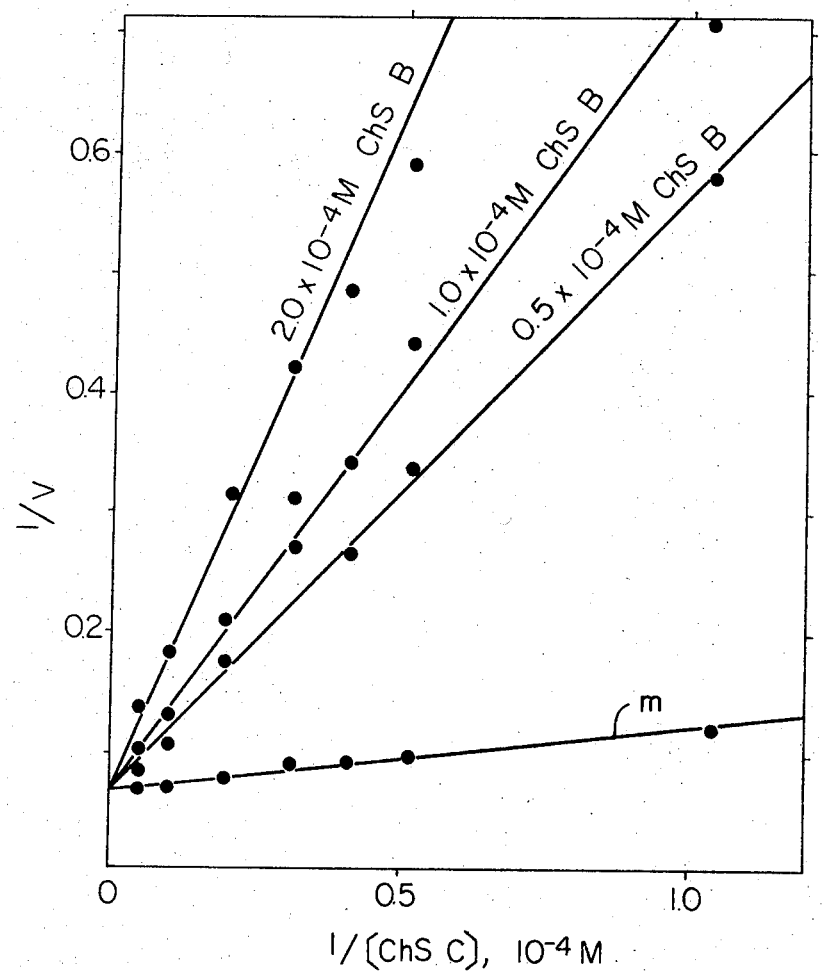
Figure 3:
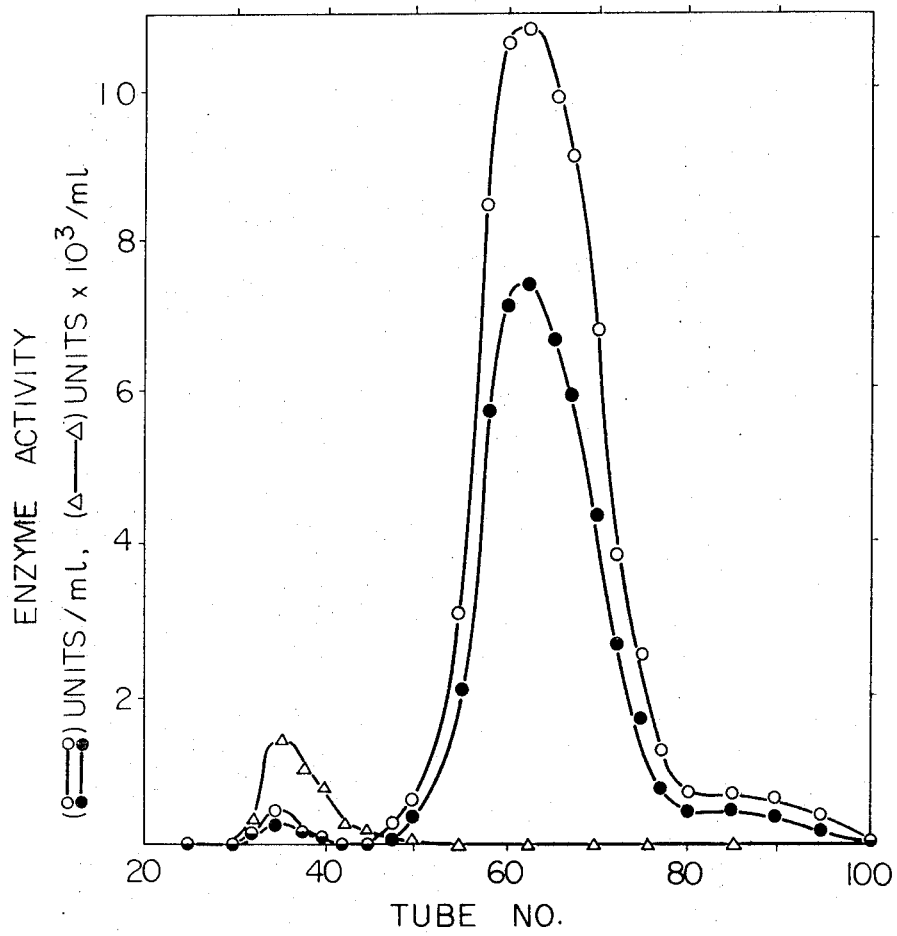

Other properties (iv) ChS B is a competitive inhibitor against this enzy[me] (FIG. 2).
(v) It degrades chondroitin sulfate D (ChS D for sho[rt])
(vi) It is eluted by treating it with a buffer solution [of] a salt for elution having a salt concentration of 0.2—[...] M, after subjecting to columchromatography with a [ca]tionic exchange cellulose (FIG. 3).
(vii) In the disc electrophoresis on acrylamide gel, it [ex]hibits a pattern shown in FIG. 5.
(viii) It exhibits the rate and extent of its degradation [of] various mucopolysaccharides as shown in FIG. 1–2.
(ix) The effect of pH on the reaction rate of its degrad[ing] ChS A, ChS B and ChS C is shown by solid lines [in] FIG. 5.
(x) Bivalent cations, $Mn^{++}$, $Mg^{++}$, $Ca^{++}$ and $Ba^{++}$ a[cti]vate the chondroitinase AC system (about 1.3–1.5-f[old] at 0.001 M), while $Zn^{++}$, $Fe^{++}$ and $Cu^{++}$ inhibit [the] system.
(xi) Heparin, heparitin sulfate and kerato sulfate inh[ibit] the chondroitinase AC reaction.
(xii) Chondroitinase-AC in 0.02 M tris-HCl buffer, [pH] 7.2, having a specific activity of 4.7 units/mg. of p[ro]tein, a protein concentration of 0.24 mg./ml., is dea[cti]vated by about 20% in three minutes, and by ab[out] 50% in 11 minutes.

The above-mentioned properties of the chondroitin[ase] AC of the invention will be detailed with reference to [the] drawings. Before doing so, we shall first describe the methods by which the results shown in the drawings w[ere] obtained.

Assay 1 is assay is based on the formation of Δ4,5-unsaturated charides that have a marked absorption in the ultra-: region. Routine incubation mixtures contained the ving compounds, in final volumes of 50 μl.: mucoaccharide substrate, 0.1μ mole as uronic acid or hexone; tris-HCl (pH 7.9 for chondroitinase-ABC, pH 7.3 hondroitinase-AC), 2.5μ moles; sodium acetate (for loitinase-ABC only), 3μ moles; bovine serum aln, 5 μg. and 0.001 to 0.005 unit of enzyme. Controls ined heat-inactivated enzyme. After incubation at 37° 0 min., reactions were stopped by diluting the mixwith 0.45 ml. of 0.05 M KCl—HCl buffer (pH 1.8). s then centrifuged at 10,800× g. for 10 minutes and ption of the supernatant of each sample was measured 2 mμ against the corresponding blank mixture. The nt of unsaturated disaccharide products was cal:d from the change in absorbance with the use of i.1, and 5.5 as millimolar absorption coefficients of )S [2 - acetamide - 2 - deoxy - 3 - O-(β-D-gluco-4-'ranosyluronic acid)-D-galactose], ΔDi-4S, and ΔDi:spectively.

e assay was linear with time and amount of enzyme : the conditions for routine assay. A unit of enzyme lefined as the quantity that catalyzed the release of tole (as unsaturated disaccharide) of product per te under the conditions described above.

Assay 2 is assay measured the conversion of a chondroitin e that is inactive with the Morgan-Elson reaction to m that is active with the color reaction. Routine inion mixtures contained the following compounds, in volumes of 50 μl.: ChS A, B, or C, 0.05μ mole as c acid; tris-HCl (pH 8.0 for chondroitinase-ABC, )H 7.3 for chrondoitinase-AC), 2.5μ moles; sodium te (for chrondoitanase-ABC only), 3μ moles; bovine 1 albumin, 5 μg.; and 0.0005 to 0.0025 unit of enzyme. ι ChS and or B was used as substrate, 0.01 unit of lro-4-sulfatase was also added to the mixtures. Concontained heat-inactivated enzyme. After incubation 0 minutes at 37°, the reaction mixtures were heated 0° for one minute, and the sample was analyzed by orate-catalyzed Morgan-Elson method.

e assay was linear with time and amount of enzyme : the conditions for routine assay. A unit of enzyme lefined as the quantity that catalyzed the release of ole (as ΔDi-0S or ΔDi-6S) of product per minute : the conditions describe above.

3. 1–2 is a graph showing an example of the rate and t of the degradation reaction of chondroitinase-AC st ChS A, ChS B, ChS C, ChS D and hyaluronic acid, as substrates. This graph shows the results of the test icted according to the procedures of Assay 1 above ing 0.003 unit of enzyme.

e curves in the graph correspond to the following rates.

○—○, ChS A; ⊕—⊕, ChS C; △—▲

D from shark cartilage; x—x, hyaluronic acid; and , ChS B. At the time indicated by the arrow a, 0.05 if enzyme was added to each 50 μl. of the incubation res of hyaluronic acid.

s seen from the results shown in FIG. 1–2 that the chondroitinase of the invention degrades ChS A and C, but does not degrade ChS B. It is also seen that it degradation reaction against ChS D. Although not 1 in the drawings, it has already been known that the enzyme of the invention exhibits a degradation reι against ChS E and ChS F. (It is expected that this ie reported in the Journal of Biological Chemistry, 43, No. 7, April 1968.)

· the sake of reference, FIG. 1—1 shows the results lilar tests to those of FIG. 1–2 with respect to the a chondroitinase-ABC. It is seen from this FIG. 1—1 that chondoitinase-ABC exhibits a degradation action against any of ChS A, ChS B and ChS C.

FIG. 2 shows the rate of degradation of ChS C in the co-presence of ChS B. The test was conducted while varying the concentration of ChS C with respect to the concentration of ChS B of $2.0 \times 10^{-4}$ M, $1.0 \times 10^{-4}$ M and $0.5 \times 10^{-4}$ M. The line $m$ in the graph shows the degradation rate of ChS C in the absence of ChS B. The velocity $v$ in the drawing is expressed as millimicromoles of ΔDi 6S formed in 10 minutes. FIG. 2 provides a typical pattern which indicates that ChS B is a competitive inhibitor against chondroitinase-AC.

The chondroitinase-AC of the invention can be eluted and extracted by columnchromatography with a cationic exchange cellulose column at a concentration of an eluting salt solution which is different from the concentration for chondroitinase-ABC extracted from the cell of the same *F. heparinum*.

FIG. 3 is a graph showing the results of separation of chondroitinases of *F. heparinum* by phosphocellulose columnchromatography.

A column of phosphocellulose (2.5×30 cm.) was equilibrated with 2 liters of 0.02 M tris-HCl buffer having a pH of 7.2. The dialyzed ammonium sulfate fraction (see Example 4) was applied to the column at the rate of 60 ml. per hour, and the adsorbent was washed with 400 ml. of 0.02 M tris-HCl buffer having a pH of 7.2. The column was developed by linear gradient elution with 400 ml. of 0.02 M tris-HCl having a pH of 7.2 in the mixing flask and 400 ml. of 0.5 M NaCl in the same buffer in the reservoir. The flow rate was 60 ml. per hour, and 8 ml. fractions were collected.

Chondroitinase was assayed by the formation of disaccharides (Assay 2) with use of the substrates, ChS A, ChS B and ChS C, respectively.

The curves in the drawing correspond to the following substrates.

○—○, ChS A; △—△, ChS B; ⊕—⊕, ChS C. The enzyme activity is expressed by units. In FIG. 3, the known chrondoitinase-ABC is observed in an eluting solution having an NaCl concentration in the vicinity of tube numbers 30–45, whereas the chondroitinase-AC of the invention is seen in an elution solution having a different NaCl concentration in the vicinity of tube numbers 50–80, and has a high activity. The concentration of NaCl is about 0.2 to 0.5 M.

Figure 4:
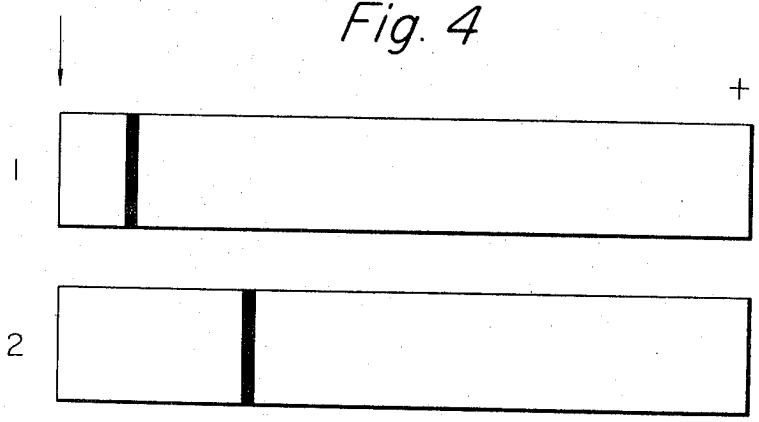

FIG. 4 shows a disc electrophoresis diagram obtained by electrophoresis on acrylamide gel of the chondroitinase-AC (about 10 μg. aliquots of the most purified fraction) and the known chondroitinase-ABC (about 10 μg. aliquots of the most purified fraction). The electrophoresis was carried out in accordance with Ornstein (Ornstein, L., Ann. N.Y. Acad. Sci., 121, 321 (1964)). The origin is indicated by the arrow. In the diagram, the numeral 1 refers to chondroitinase-ABC, and numeral 2, to the chondroitinase-AC of the invention.

Figure 5:
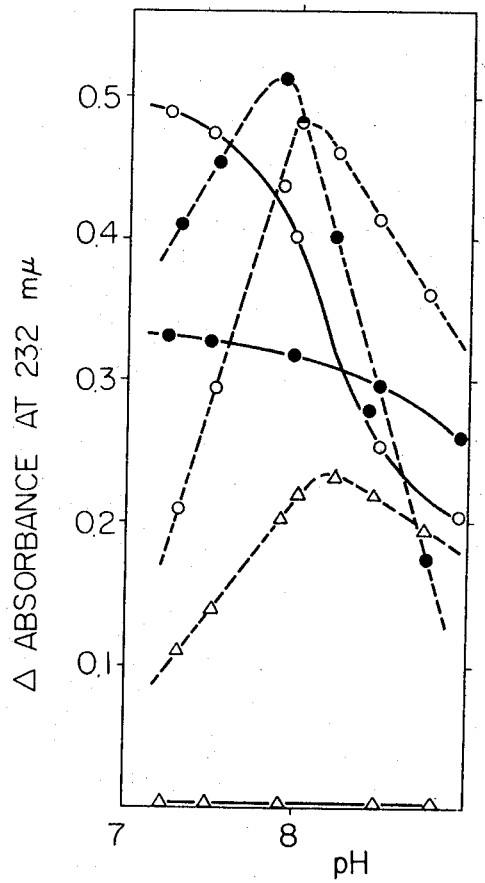

FIG. 5 shows the effect of pH on the rate of degradation of ChS A, ChS B and ChS C with the chondroitinase-AC of the invention and the known chondroitinase-ABC. The experiments were conducted in accordance with the procedures mentioned in Assay 1 above. In the diagram, the solid line shows the results with respect to chondroitinase-AC, and the broken line, chondroitinase-ABC. The curve ○—○, △—△ and ⊕—⊕ correspond ChS A, ChS B and ChS C, respectively. It is seen from this FIG. 5 that the known chondroitinase-ABC degrades any of ChS A, ChS B and ChS C, whereas the chondroitinase-AC of the invention degrades ChS A and ChS C but does not degrade ChS B. It is also seen that the influence of the pH differs for both of these enzymes.

As mentioned in detail above, the novel chondroitinase-AC of the invention is clearly distinguished from the known chondroitinase in respect of the basic properties (i), (ii) and (iii), and is a novel enzyme which is also different in various other properties.

One method of extracting chondroitinase-AC of the invention comprises extracting the cell of *Flavobacterium heparinum* with an aqueous solvent, subjecting the obtained extract to columnchromatography with a cationic exchange cellulose column, and recovering from the said column eluate which is eluted with a buffer solution of an eluting salt having a salt concentration of 0.2 to 0.5 mole.

The method of extracting and purifying this chondroitinase-AC will be explained in detail in the pages that follow.

The soil bacterium *F. heparinum* from which the chondroitinase-AC of the invention is extracted is a known bacterium, and the composition of its culture medium, suitable culture conditions, etc. are known. It is usually cultured in a medium containing a carbon source and nitrogen source for about 8 to 24 hours at a pH of about 6.8 to 7.0 and at a temperature of about $30\pm3°$ C. The culturing can be effected either by a liquid culture or solid culture method, commercially recommended being a tank culturing method. It is usual that the culturing is done under aerobic conditions.

One example of the culture medium is a medium adjusted with HCl to a pH of about 7 and containing 7 g. of trypticase, 6 g. of phytone, 1 g. of glucose, 3 g. of NaCl, 1 g. of $K_2HPO_4$ and 1 g. of ChS C per liter. In addition to these, polypeptone, meat extract, yeast extract, or malt extract can also be utilized.

To extract the chondroitinase-AC of the invention, the first procedure is to extract the cell of *F. heparinum* with an aqueous solvent. Preferable as such solvent is water or a buffer solution. The cell is separated from the culture liquid, and preferably washed with water or a buffer solution. Usually, the cell is suspended in the water of buffer solution, and is pulverized by means generally used for pulverizing cells, such as a sonic oscillator, French press and sea sand, thus making it easy to extract the intended enzyme from the cell. At the end of the extraction, the extract is separated from the cell debris by means of a suitable separating means such as a refrigerated centrifugation. As the buffer solution, tris-HCl [tris(hydroxymethyl) aminomethane-hydrochloric acid] is especially preferable, but other buffer solutions, for instance, phosphate buffer solutions such as sodium phosphate and potassium phosphate, tris-maleate buffer, and barbital buffer can also be used. The pH of the buffer solution is about 5 to about 8, especially preferable being $6.5\pm1.0$. It is preferred that such extracting procedure as pulverization and separation should be carried out at low temperatures, for instance a temperature above the freezing point of the solvent and below 40° C., preferably $-5°$ C. to room temperature, especially preferably $-2°$ to 10° C., above all $3\pm3°$ C. The cell debris as it is or together with a fresh cell may be re-used for extraction.

The obtained extract, if desired, may be stored at low temperatures, usually below 0° C., for instance, temperatures of as low as $-10°$ to $-20°$ C. The extract after separation of the cell is then subjected to columnchromatography with a cationic exchange cellulose column. It is preferred that the extract to be treated should be used as a buffer solution having a pH adjusted to $7.3\pm0.3$ in advance. If desired, the extract obtained by extraction with an aqueous solvent is dialyzed with the use of a buffer solution as the receiving solvent, and the resulting dialyzate may be used. In this case, the low-molecular-weight impurities such as inorganic materials present in the extract transfer to the receiving solvent, and this serves for the purification of the extract.

As the cationic exchange cellulose, phosphocellulose is especially recommended. Carboxymethyl cellulose can also be used. If desired, other cationic exchange celluloses such as sulfoethylcellulose and sulfomethylcellulose can be used.

The concentration of the buffer in the buffer solution may vary within a range of 0.005 to 0.1 M usually, preferably 0.01 to 0.05 M. It is also variable depending on the type of the buffer to be used. If tris-HCl buffer is used concentration of about $0.02\pm0.01$ is recommendable.

In actual procedure, it is preferred that the catioı exchange cellulose column should be equilibrated, pr to operation, with a buffer solution having the similar ɪ and concentration as a liquid to be treated. It is, of cour unnecessary to make the pH and concentration of it cı respond completely with those of the liquid to be treatı

After that, the adsorbent is washed by passing a buf solution of the similar composition through the colun and eluted with a buffer solution having dissolved therı a suitable eluting salt while changing the concentrati of the salt in the said buffer solution. The salt concent tion may be changed either consecutively or stepwi The final product is recovered from the column as eluate which is eluted when the salt concentration in ı buffer solution is 0.2 to 0.5 M. Especially preferable el ing salts are sodium chloride and potassium chloride. ʋ can also mention neutral salts such as lithium chlorii magnesium chloride and ammonium sulfate.

In an eluate obtained by elution with a buffer soluti having a salt concentration below 0.2 M, an enzyme present which, like the known chondroitinase-ABC, ( grades any of ChS A, ChS B and ChS C. If desired, the fore, chondroitinase-ABC can be obtained as by-prodı from such eluate.

As a matter of course, the column adsorption and e tion procedures may be repeated. Other various pro dures of the invention, if desired, can also be repeated.

The obtained eluate can be stored as it is, or after hɪ ing been dried under low temperature conditions such a freezed drying and low temperature vacuum drying.

Although not necessary, the extract, prior to colun chromatography with a cationic exchange cellulose c umn, may be subjected to such pre-treatments as remo of nucleic acid, fractionation with ammonia sulfɪ dialysis, and filtration with a gel filtering agent.

For instance, the cell of *Flavobacterium heparinum* extracted with water or a buffer solution; the extract salted out and fractionated by addition of such a salt-ı agent as ammonia sulfate in an amount of 80% of satu tion; the salt-out agent is removed by dialysis or filtering agent treatment from the water or buffer soluti in the resulting precipitate; and then the extract deprıʋ of the salt-out agent is subjected to columnchromatograp with a cationic exchange cellulose column.

The above-mentioned salting-out is carried out by aı ing a salt-out agent of an amount 50% of saturation the extract, removing the separated portion, and add to the residual liquid a salt-out agent of an amount 8( of saturation, and from the water or buffer solution the precipitated portion, the salt-out agent is similɪ removed.

The following procedure is also possible. Prior to said salting out, there is added a solution in water a buffer solution of about 5% of a nucleic acid remov agent such as streptomycin sulfate or protamine sulf which couples with nucleic acid and precipitates it, pı erably under stirring in a manner such that streptomy sulfate may be about 1% (weight/volume) of the traction at the end of the addition; the resulting prec tate is separated and removed, and then the above salti out is carried out. Or it is also possible to subject ı liquid deprived of the nucleic acid to the said colun chromatography treatment.

When the salting-out is carried out in the above manı the obtained precipitated portion is subjected to the p cedure of removing the salt-out agent, as a solution o in a buffer solution, preferably a tris-HCl buffer soluti This procedure can be effected by a known dialysis mɛ od under the similar pH and temperature conditions in the extraction from the cell. Thus, a pre-treated extr is obtained as a dialyzate resulting from the removal the salt-out agent by dialysis of a solution of the salt nd fractionated precipitate portion in a buffer solue removal of the salt-out agent can also be effected eatment with a known gel filtering agent such as idex (trade name for a cross-linked dextran, product harmasia Co., Sweden). This treatment is usually by pouring a liquid to be treated down through a in of the filtering agent; but if desired, the filtering is added to the liquid to be treated, and filtration ne after it has been thoroughly wetted. These differ- rocedures of removing the salt-out agent may be intly employed, as a matter of course.

e extract so deprived of the salt-out agent may be d at low temperature as a liquid solution or after g been dried by means of such low temperature dry- leans as freezed drying and low temperature vacuum g.

purification means for purifying chondroitinase-AC higher purity may be added to the process of the tion for practise subsequent to the columnchroma- phy with a cationic exchange cellulose column. For ple, a salt for salting-out, such as ammonium sul- is added to the obtained liquid, preferably to satura- the resulting precipitate is dissolved in the said buffer on, for instance, tris-HCl buffer solution; or the eluate is concentrated under reduced pressure, for ice, at a temperature below 40° C., preferably the t possible temperatures as mentioned with respect to id extraction, under the pH conditions as mentioned with respect to the said extraction, either of such so- i or liquid is subjected to the columnchromatography a column of such a gel filtering agent as Sephadex; olumn is eluted with a diluted aqueous solution of id eluting salt, preferably sodium chloride or potas- chloride, and usably lithium chloride, magnesium ide or ammonium sulfate; and thereby a fraction ing chondroitinase activities is recovered.

is preferable that the amount of the buffer solution used for dissolving the resulting precipitate should small as possible, for instance, several milliliters, he total amount to be treated should not be too much. the above-mentioned elution with a diluted aqueous on of the said eluting salt, chondroitinase-AC is l when the amount of the solvent is about 2 times lume filling the voids among the particles of the gel ng agent, and is eluted almost 100% when it is about ies. Such foreign matters as glucuronidase are far difficult to elute than chondroitinase-AC, and show activity only at a point where the elution of chon- nase ends. It is possible therefore to remove such in matters without the loss of chondroitinase-AC.

w, a few embodiments of extracting and recovering hondroitinase-AC of the invention are given below.

Example 1

*vobacterium heparinum*, ATCC 13125, pre-cultured lask was inoculated into 15 litre of a liquid medium g a pH of 7.0 and containing 1.5% of polypeptone, ó of meat extract, 1% of yeast extract, 1% of malt :t, 0.2% of chondroitin sulfate (Na salt) and 0.15% dium chloride, and cultured for 8 to 24 hours at a ?rature of 30° C. The culturing was terminated when ptical density of this culture liquid was 4.0 to 10.0 0 m$\mu$. The liquid was centrifuged at high speed, and ?ll was collected. The cell was suspended in two to times its weight of distilled water cooled to about ., centrifuged, and recovered (washing treatment). )btained cell was again suspended in about thrice its t of distilled water, and treated in a sonic oscillator to 10 minutes. The resulting liquid was centrifuged ) minutes at 0 to 10° C. at 17500× g., and the pre- ted cell debris was removed. The so obtained crude :t was dialyzed at 0 to 10° C. with the use of several its weight of 0.02 M tris-HCl having a pH of 7.3, ipplied to a phosphocellulose column (5 x 95 cm.) previously equilibrated with a tris-HCl buffer. The adsorbent was washed with the same buffer solution, and then chondroitinase was eluted by consecutively raising the concentration of the common salt from 0 M to 0.5 M. The eluate was collected with a fraction collector. Examination of the chondroitinase activity revealed two peaks of activity. The enzyme eluted at a stage where the salt concentration is low (less than 0.2 M) is chondroitinase-ABC, and the enzyme eluted at a stage where the salt concentration is high (0.2–0.5 M) is chondroitinase. Eluted in a zone intermediate between chondroitinase-ABC and chondroitinase-AC was glucuronidase which degrades ΔDi0S and ΔDi6S formed by the action of chondroitinase, to monosaccharides. The so obtained chondroitinase-AC had a total enzymic activity of 1,050 units and a specific activity of 45 units/mg. of protein. The eluate of chondroitinase-AC is usually used after concentration and dialysis by a general procedure.

Example 2

*Flavobacterium heparinum*, ATCC 13125, was pre-cultured in a flask. It was then inoculated into 15 litre of a liquid medium having a pH adjusted to 6.8 and containing 0.7% of trypticase, 0.6% of phytone, 0.1% of glucose, 0.3% of NaCl, 0.1% of $K_2HPO_4$ and 0.1% of chondroitin sulfate (Na salt), and cultured for about 10 hours at 30° C. The obtained cultured liquid was centrifuged at high speed, and the precipitated cell was collected. The cell was suspended in about 4 times its weight of 0.02 M tris-HCl buffer having a pH of 7.3, and disrupted by means of a French press. The obtained suspension was centrifuged for 25 minutes at 20,000× g. at a temperature of 0 to 10° C., and the precipitated matters such as the cell debris were removed. This crude extract was subjected to a phosphocellulose column to purify chondroitinase-AC. The conditions for columnchromatography were the same as those of Example 1. The resulting chondroitinase-AC had a total enzymic activity of 940 units and a specific activity of 56 units/mg. of protein.

Example 3

Ammonium sulfate was added to a part of a fraction of chondroitinase-AC eluted from the phosphocellulose column in Example 1 (the chondroitinase-AC having a total unit of 450 and a total protein of 10 mg.) at 0 to 5° C. until 80% of the saturation was reached, whereby chondroitinase and other matters are precipitated. These were collected by centrifugation. The obtained precipitate was dissolved in about 2 ml. of 0.03 M sodium phosphate having a pH of 7.0. The resulting solution was applied to a Sephadex G–200 column (2.4 x 88 cm.) equilibrated in advance with a solution of a buffer having a common salt concentration of 0.1 M, and was eluted with the same salt buffer solution. The eluate was collected by means of a fraction collector. Examination of the activity of chondroitinase-AC revealed that the activity is seen when the eluting solution was 200 ml. and almost 100% of it had been eluted by the time when it was 300 ml. If a tiny amount of the glucuronidase is present in a pre-stage of the purification, the glucuronidase begins to be eluted after the end of the elution of chondroitinase-AC. It can therefore be removed almost completely. The so obtained chondroitinase-AC had a total enzymic activity of 410 units and a specific activity of 120 units/mg. of protein.

Example 4

250 ml. of 0.02 M tris-HCl having a pH of 7.3 containing 5% of streptomycin sulfate was added to one liter of a crude extract extracted from the cell of *Flavobacterium heparinum* in the same manner as in Example 2, and they were stirred for one hour. The resulting precipitate was discarded by centrifugation, and ammonium sulfate was added to the supernatant liquid to 50% of saturation. After stirring, the precipitate was discarded by centrifugation, and ammonium sulfate was further added to the supernatant liquid to 80% of saturation. After stirring and centrifugation, the obtained precipitate was dissolved into 0.02 M tris-HCl having a pH of 7.3, and the solution was thoroughly dialyzed with the use of the same buffer solution. The dialyzate was subjected to column chromatography with a phosphocellulose column in the same manner as in Example 1, and the intended product was obtained. The obtained chondroitinase-AC had a total enzymic activity of 780 units and a specific activity of 76 units/mg. of protein.

I claim:

1. A novel enzyme chondroitinase-AC extracted from the cell of *Flavobacterium heparinum* having the following properties:

(i) It degrades chondroitin sulfate A;
(ii) It does not degrade chondroitin sulfate B;
(iii) It degrades chondroitin sulfate C; and
(iv) Chondroitin sulfate B is a competitive inhibitor against said enzyme, said enzyme being obtained by extracting the cell of *Flavobacterium heparinum* with an aqueous solvent, subjecting the obtained extract to columnchromatography with a cationic exchange cellulose column, and thereafter recovering from said column an eluate eluted with a buffer solution of a concentration effective to elute the desired enzyme.

2. A method of recovering a novel enzyme chondroitinase-AC, which comprises extracting the cell of *Flavobacterium heparinum* with an aqueous solvent, subjecting the obtained extract to columnchromatography with a cationic exchange cellulose column, and recovering from the said column an eluate eluted with a buffer solution having an eluting salt concentration of 0.2 to 0.5 M.

3. The method according to claim 2 wherein the said aqueous solvent is selected from the group consisting of water and a buffer solution.

4. The method according to claim 2 wherein the pH of the said aqueous solvent is about 5 to about 8.

5. The method according to claim 3 wherein the said buffer solution is selected from the group consisting of phosphate buffers, tris-HCl buffer, tris-maleate buffer and barbital buffer.

6. The method according to claim 2 wherein the sa extracting is carried out at a temperature above the free ing point of the said aqueous solvent and below 40° C.

7. The method according to claim 2 wherein the o tained extract is dialyzed with the use of a buffer sol tion as the receiving solvent, and the dialyzate is su jected to the columnchromatography.

8. The method according to claim 2 wherein the e tract to be subjected to the columnchromatography is buffer solution having a pH adjusted to 7.3±0.3.

9. The method according to claim 2 wherein the cz ionic exchange cellulose is selected from the group co sisting of phosphocellulose and carboxymethylcellulos 10. The method according to claim 8 wherein the co centration of the buffer in the said buffer solution is 0.0( to 0.1 M.

11. The method according to claim 2 wherein tl eluate is concentrated and then subjected to colum chloride, potassium chloride and lithium chloride.

12. The method according to claim 2 wherein tl eluate is concentrated and then subjected to colum chromatography with the use of a Sephadex column; aı the column is eluted with a dilute aqueous solution of ؛ eluting salt to thereby recover a fraction showing tl chondroitinase activities.

13. The method according to claim 12 wherein tl liquid to be subjected to columnchromatography has pH of about 5 to about 8.

14. The method according to claim 12 wherein tl said eluting salt is selected from the group consistiı of sodium chloride, potassium chloride, lithium chlorid magnesium chloride, and ammonium sulfate.

References Cited

Yamagata et al., Biochica Biophysica Acta, vol. 11 pp. 250–252 (1966).

Yamagata et al., Journal of Biological Chemistry, vc 243, No. 7, Apr. 10, 1968, pp. 1523–1535.

LIONEL M. SHAPIRO, Primary Examiner

U.S. Cl. X.R.

195—66, 103.5

UNITED STATES PATENT OFFICE
CERTIFICATE OF CORRECTION

Patent No. 3,549,500    Dated December 22, 1970

Inventor(s) SAKARU SUZUKI

It is certified that error appears in the above-identified patent and that said Letters Patent are hereby corrected as shown below:

Claim 11, after "wherein the" delete "eluate is concentrated and then subjected to column-" and substitute therefor -- eluting salt is selected from the group consisting of sodium --.

Signed and sealed this 22nd day of June 1971.

(SEAL)
Attest:

EDWARD M. FLETCHER, JR.
Attesting Officer

WILLIAM E. SCHUYLER, JR
Commissioner of Patents